(No Model.) 2 Sheets—Sheet 1.
C. W. FOWLER.
ELEVATOR.
No. 472,113. Patented Apr. 5, 1892.
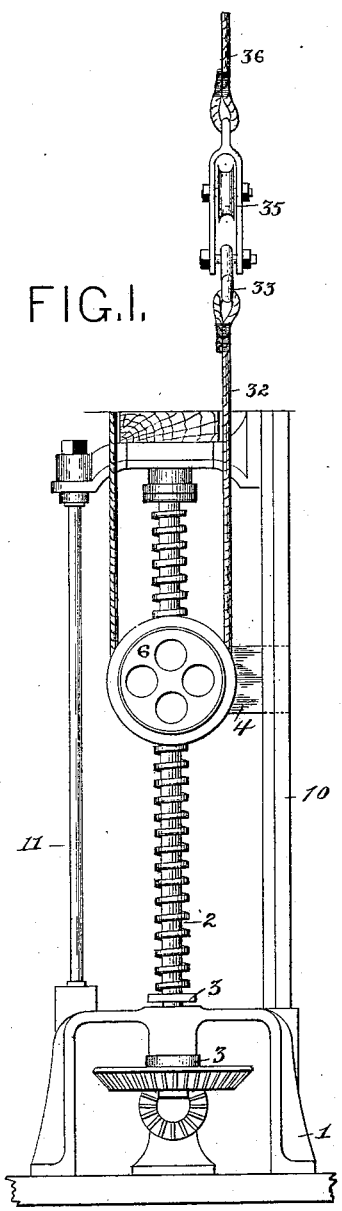
FIG.I.
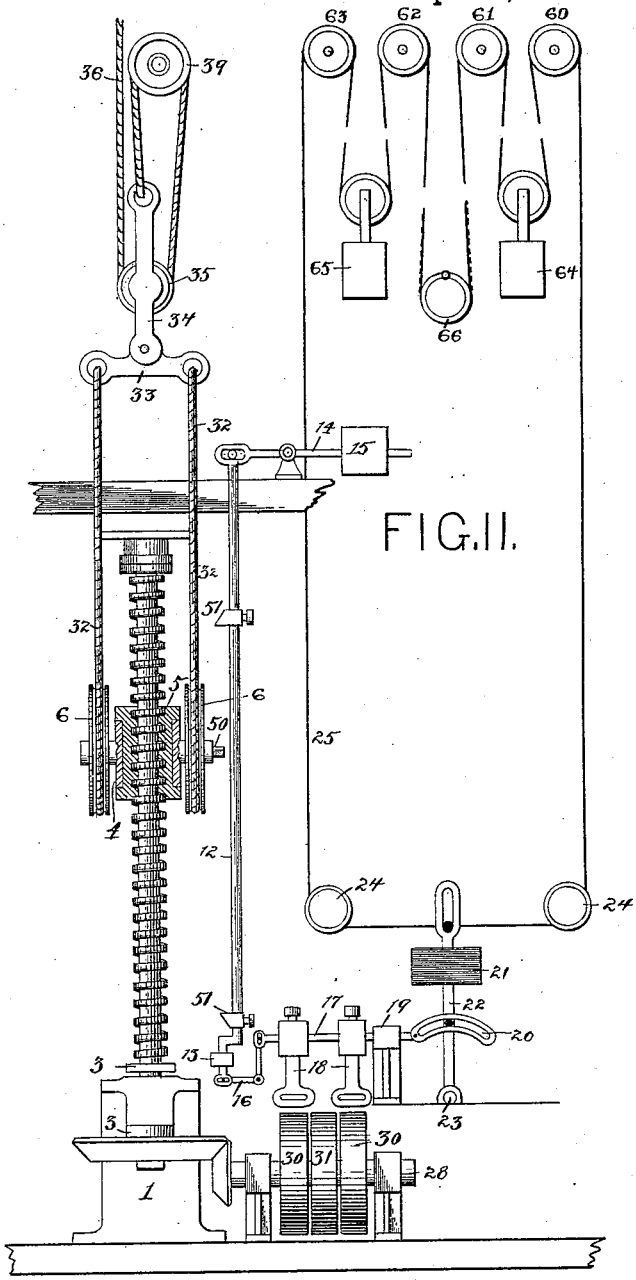
FIG.II.
Witnesses:
Jonathan Celley
John Gustafson
Inventor:
Charles W. Fowler,
by Pollok & Mauro,
his Attorneys.
THE NORRIS PETERS CO., PHOTO-LITHO., WASHINGTON, D. C.

(No Model.) 2 Sheets—Sheet 2.
C. W. FOWLER.
ELEVATOR.
No. 472,113. Patented Apr. 5, 1892.
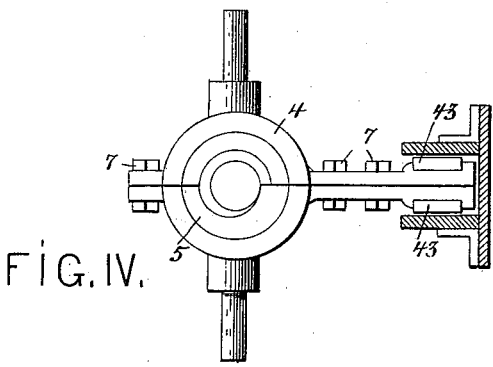
FIG. IV.
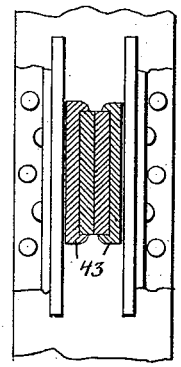
FIG. V.
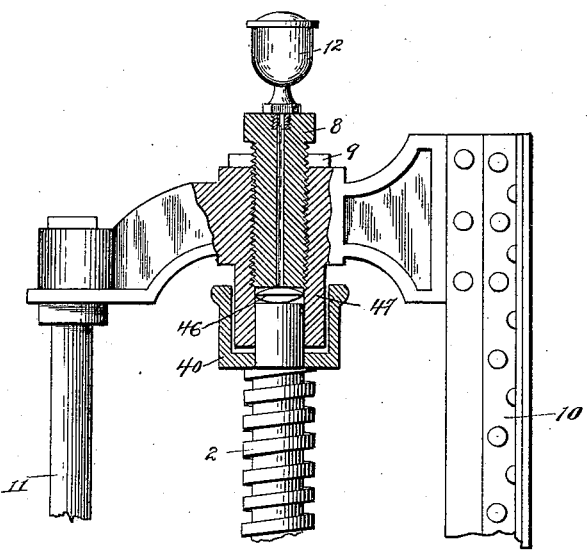
FIG. VI.
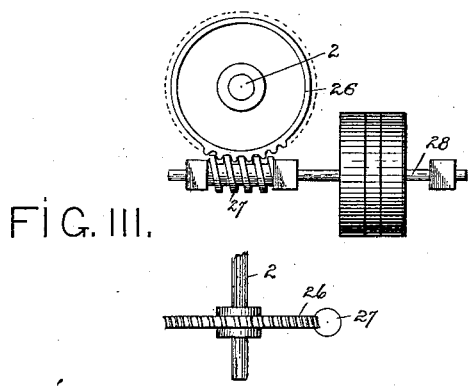
FIG. III.
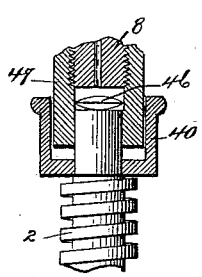
FIG. VII.
Witnesses:
Jonathan Ailey
John Gustafson
Inventor:
Charles W. Fowler,
By Pollok & Mauro,
his Attorneys.

UNITED STATES PATENT OFFICE.

CHARLES W. FOWLER, OF BALTIMORE, MARYLAND.

ELEVATOR.

SPECIFICATION forming part of Letters Patent No. 472,113, dated April 5, 1892.

Application filed May 23, 1891. Serial No. 393,858. (No model.)

*To all whom it may concern:*

Be it known that I, CHARLES W. FOWLER, a resident of Baltimore, State of Maryland, have invented a new and useful Improvement in Screw-Elevators, which improvement is fully set forth in the following specification.

This invention relates to the construction of screw-elevators, and comprises certain improvements particularly applicable to the form of apparatus described in Letters Patent No. 439,647, granted to me November 4, 1890.

The invention includes improvements in the construction of the traveling nut and in means for guiding the same, improvements in the mounting of the screw and in the gearing for transmitting motion thereto, and improvements in the means for stopping and reversing the screw.

These improvements can most conveniently be explained in connection with the accompanying drawings, in which—

Figure I is a front elevation of mechanism constructed in accordance with the invention. Fig. II is a side view, partly in vertical section. Fig. III shows details of gearing for driving the screw. Fig. IV is a plan view, partly in cross-section, of the nut and guides. Fig. V is a side elevation, partly in vertical section, of the guides; and Figs. VI and VII are details illustrating the preferred form of bearing for the top of screw.

The improvements are shown as applied to an upright screw; but it will be obvious that many of them are equally applicable to a horizontal screw.

A heavy casting 1, bolted to the floor, is bored to form a bearing for the lower end of the screw 2, the top and bottom faces of the casting being planed true to receive the thrust-collars 3, of phosphor-bronze or equivalent material, which are fixed to the screw-splindle. The sliding cross-head 4 is made in two parts, which hold the nut 5, (also made in two parts,) the two halves of the cross-head being joined in the plane of the screw-axis and clamped together by bolts 7, and the nut held from turning therein by any suitable means. The sheaves 6 are journaled on the cross-head, and over them are carried the ropes 32, made fast at one end to a beam and at the other attached to the balance-bar 33, pivoted in the moving sheave-frame 34, in which is journaled the sheave 35. The second or elevator rope 36 is made fast at one end to the frame 34, then carried over the stationary sheave 39, under the sheave 35, and thence to the elevator-car.

As shown in Figs. VI and VII, the upper end of the screw-spindle is journaled in the chambered casting 47, supported by the guide-bar 10 and rod 11. The upper part of the chamber, which receives the journal of the screw, is threaded to receive a screw-plug 8, having an oil-passage and held in place by a check-nut 9. Screw-plug 8 is surmounted by an oil-cup 12. Between the screw 8, which has a smooth and hardened end, and the top of the hoisting-screw 2 is interposed a lens or disk 46, of steel, phosphor-bronze, or similar material, adapted to receive the upward thrust of the screw. A cup-shaped receiver 40 is shrunk onto the screw-spindle 2 and surrounds the tubular bearing. This receiver is adapted to catch the oil supplied to the bearing, and, as its rim is above the lens 46, it will always keep the bearing full of oil, while any overflow will serve to lubricate the nut 5.

It is desirable that the thrust-screw 8 should not be clamped down hard, so as to confine the screw 2 rigidly. In the first place it is expedient to provide for some expansion of the screw-shaft; but the main object of allowing for a slight vertical play of the screw is to utilize the weight of the screw (which may be made as heavy as desired) to counterbalance in part the weight of the elevator-car. The arrangement also reduces the friction of the end of the shaft or the thrust-collar 3. The screw may be regarded as practically hung in the bight of the cord 32, so that the weight of the car tends to lift the screw.

In Fig. VII the screw is shown in the position it would occupy with the weight of the car off the screw. The disk 46 may obviously be omitted and the resistance to the thrust confined to the collars at the bottom of the screw.

To secure the effect desired, the vertical play allowed the screw need be but very slight. Thus, as shown in Figs. I and II, in which the weight of the car is supposed to be on the screw, this being the normal condition, the upper thrust-collar 3 is not in contact with the casting 1, but a thin space is left between. The end of the screw-shaft which passes through the hub of the bevel-gear is squared, so that said shaft can move vertically of said wheel, but not independently thereof. Any suitable arrangement of the driving mechanism which will permit of the vertical play of the screw-shaft may be adopted.

The cross-head 4 is provided at its ends with shoes 43, Figs. IV and V, which are adapted to slide in the channel of the guide-bar 10. These shoes may be made of anti-friction material or composition and are removable. The bar 10 thus serves as a support and also to guide the nut and prevent its twisting.

In elevators of various sorts it is usual to provide stops, generally called "knockers," on the shifting hand-rope to arrest the car automatically at the limits of its travel. These devices are sometimes displaced or fail to work for other reasons, and to insure certainty of arresting the car I combine the shifter-rope 25 and the mechanism actuated thereby with an automatic stop action operated by the traveling cross-head. This part of the invention may be carried out as shown in Fig. II, in which the ordinary shifter hand-rope 25 runs over the small pulleys 24 and operates the lever 22, which is fulcrumed at 23 and carries the overweight 21. The shifter-bar 17, which carries the belt-loops 18, slides in bearings 19 and connects at one end with lever 22 by means of a curved slot 20 and at the other by a bell-crank lever 16 with the upright rod 12. The latter can slide in the blocks 13, and it carries the adjustable lugs or stops 51, which are in the path of a pin or projection 50, carried by the cross-head 4. The driving-shaft 28 has the usual loose pulleys 30 and intermediate fast pulley 31. When pin 50 strikes one of the stops 51, the rod 12 will be gradually moved with the nut until the belt at that time driving pulley 31 is moved to the adjacent loose pulley. The motion of the nut being quite slow compared with that of the car, the operation of this stop-action is very gradual and certain. Rod 12 is connected at its upper end with a lever 14, which carries a counter-weight 15. The shifter hand-rope 25 runs over a series of small pulleys 60 61 62 63 at the top of the well. Between pulleys 60 61 and 62 63, respectively, the rope makes loops, in which are hung the take-up weights 64 65. Between pulleys 61 62 the rope descends to the car and runs over a hand-wheel 66, by which the shifter mechanism is operated from the car. As the latter moves up, the tension-weights on each side of it take up the slack in the cord, paying it out as the car descends.

In Fig. II the screw 2 is shown as being driven by bevel-gears; but in Fig. III, I have shown an arrangement which has advantages particularly in small elevators where the load is a light one. 26 is a worm-wheel keyed to the screw-spindle 2, and 27 is a worm engaging therewith, said worm being on the driving-shaft 28. This arrangement avoids completely the danger of the car running away with the nut in case of the power failing when the car is full-loaded. Although the nut 5 might cause the screw to revolve at high speed with ordinary gearing, the action of the worm even with no power behind it would check the rotation of the screw.

It will be obvious that modifications may be made in details of construction and that some of the improvements may be used separately without departing from the spirit of the invention.

I claim—

1. In combination with the nut and cross-head carrying sheaves for the hoisting-rope, the upright screw free to move lengthwise, so that its weight opposes that of the elevator-car, substantially as described.

2. The combination, with the traveling nut and cross-head, of the lifting-screw journaled at its upper end in a suitable bearing, a screw-plug closing the chamber in which the screw is journaled and provided with an oil-passage, and an anti-friction disk or lens between the screw and plug, substantially as described.

3. The combination of the upright screw journaled at its upper end in a chamber, a plug closing the top of said chamber and provided with an oil-passage, a lens or anti-friction disk between said plug and screw, and a receiver or cup carried by the screw and extending outside of the bearing above the level of the top of the screw, substantially as described.

4. The combination, with the screw, of the cross-head and nut, both made in halves, and joined in the plane of the axis of said screw, the nut being clamped between the two parts of the cross-head, substantially as described.

5. The combination of the screw, the cross-head carrying the nut, and the channeled support and guide-bar, the cross-head being provided with shoes which slide in said guide-bar, substantially as described.

In testimony whereof I have signed this specification in the presence of two subscribing witnesses.

CHARLES W. FOWLER.

Witnesses:
PHILIP MAURO,
JONATHAN CILLEY.